US012619021B2

(12) United States Patent
Baek et al.

(10) Patent No.: US 12,619,021 B2
(45) Date of Patent: May 5, 2026

(54) POLARIZING PLATE AND OPTICAL DISPLAY APPARATUS COMPRISING THE SAME

(71) Applicant: SAMSUNG SDI CO., LTD., Yongin-si (KR)

(72) Inventors: Il Woong Baek, Suwon-si (KR); Yeon Ju Jung, Suwon-si (KR); Seo Young Kang, Suwon-si (KR); Seon Oh Hwang, Suwon-si (KR); Kwang Ho Shin, Suwon-si (KR); Jong Kyu Choi, Suwon-si (KR)

(73) Assignee: Wuxi Hengxin Optoelectronics Materials Co., Ltd., Wuxi (CN)

(*) Notice: Subject to any disclaimer, the term of this patent is extended or adjusted under 35 U.S.C. 154(b) by 722 days.

(21) Appl. No.: 17/969,597

(22) Filed: Oct. 19, 2022

(65) Prior Publication Data

US 2023/0117635 A1 Apr. 20, 2023

(30) Foreign Application Priority Data

Oct. 20, 2021 (KR) ........................ 10-2021-0139994

(51) Int. Cl.
*G02B 5/30* (2006.01)

(52) U.S. Cl.
CPC ......... *G02B 5/3083* (2013.01); *G02B 5/3025* (2013.01)

(58) Field of Classification Search
CPC ...... G02B 5/3083; G02B 5/3025; G02B 5/30; G02B 5/3033; G02B 5/3041; G02B 5/305; G02B 1/111; G02B 1/14; G02B 1/18; G02F 1/133528; H10K 59/50
See application file for complete search history.

(56) References Cited

U.S. PATENT DOCUMENTS

| | | | | |
|---|---|---|---|---|
| 2008/0218671 A1* | 9/2008 | Nakamura | ........... | G02B 5/3083 428/212 |
| 2013/0249378 A1* | 9/2013 | Murakami | ........... | G02B 5/3083 359/488.01 |

(Continued)

FOREIGN PATENT DOCUMENTS

| | | |
|---|---|---|
| JP | 2010-078876 A | 4/2010 |
| KR | 10-2013-0103595 A | 9/2013 |

(Continued)

OTHER PUBLICATIONS

Korean Office Action dated Nov. 5, 2024, issued in corresponding Korean Patent Application No. 10-2021-0139994 (5 pages).

*Primary Examiner* — Stephone B Allen
*Assistant Examiner* — Adam W Booher
(74) *Attorney, Agent, or Firm* — Ricky Lam

(57) ABSTRACT

A polarizing plate and an optical display apparatus including the same are provided. A polarizing plate includes: a polarizer; a protective layer stacked on a surface of the polarizer; and a retardation layer stacked on another surface of the polarizer, and the protective layer has an in-plane retardation of 3,000 nm or more at a wavelength of 550 nm, an optical axis of the protective layer is tilted at an angle of −2° to +2° with respect to a light absorption axis of the polarizer, and the polarizer has a single transmittance of 44.0% or more and a minimum crossed transmittance of 0.005% or more at a wavelength of 400 nm to 700 nm.

13 Claims, 1 Drawing Sheet

(56) References Cited

U.S. PATENT DOCUMENTS

| | | | | |
|---|---|---|---|---|
| 2016/0062011 | A1* | 3/2016 | Shin | G02B 5/305 359/489.07 |
| 2017/0285236 | A1* | 10/2017 | Ryu | G02B 1/14 |
| 2020/0012016 | A1 | 1/2020 | Heo et al. | |
| 2020/0341316 | A1* | 10/2020 | Kim | C08L 67/02 |

FOREIGN PATENT DOCUMENTS

| | | | | |
|---|---|---|---|---|
| KR | 10-2032316 | B1 | 10/2019 | |
| KR | 10-2020-0082442 | A | 7/2020 | |
| KR | 10-2020-0091720 | A | 7/2020 | |
| KR | 10-2020-0109190 | A | 9/2020 | |
| WO | WO-2020184862 | A1 * | 9/2020 | C08J 5/18 |

* cited by examiner

POLARIZING PLATE AND OPTICAL DISPLAY APPARATUS COMPRISING THE SAME

CROSS-REFERENCE TO RELATED APPLICATION

This application claims priority to and the benefit of Korean Patent Application No. 10-2021-0139994, filed on Oct. 20, 2021 in the Korean Intellectual Property Office, the entire disclosure of which is incorporated herein by reference.

1. FIELD

Aspects of embodiments of the present invention relate to a polarizing plate and an optical display apparatus including the same.

2. DESCRIPTION OF THE RELATED ART

An organic light emitting diode display can suffer from deterioration in visibility and contrast ratio due to reflection of external light. In order to solve such a problem, a polarizing plate for antireflection is used.

The polarizing plate for antireflection includes a polarizer, a protective layer stacked on a surface of the polarizer, and a retardation layer stacked on another surface of the polarizer. External light entering the polarizer through the protective layer is extinguished through sequential reflection and/or transmission in the sequence of the retardation layer, an organic light emitting diode panel, the retardation layer and the polarizer, thereby solving the above problem.

Since the protective layer does not directly participate in an antireflection function of the polarizing plate, a film substantially having an in-plane retardation of 0 nm at a wavelength of 550 nm, such as a triacetylcellulose (TAC) based film is used as the protective layer. However, since the TAC film has a high water vapor transmission rate and thus may reduce durability of the polarizing plate under high temperature/humidity conditions, a film having a low water vapor transmission rate such as polyethylene terephthalate (PET) based, cyclic olefin polymer (COP) based or acrylic based film may be used for the purpose of improving durability for the polarizing plate. However, these films have higher retardation values than the TAC based film and an optical axis due to a stretching process. In particular, the PET based film has problems due to birefringence thereof and, thus, when it does not have a high in-plane retardation, a rainbow mura may appear.

The polarizing plate for antireflection requires an antireflective retardation film on one surface of the polarizer to convert linear polarization into circular polarization. However, in measurement of optical characteristics of the polarizing plate, when light is transmitted from the antireflective retardation film to the polarizer, the light is converted into circularly polarized light, thereby causing significant deterioration in measurement accuracy of the optical characteristics of the polarizing plate. Thus, the optical characteristics of the polarizing plate are measured while transmitting light in a direction from the protective layer to the polarizer.

However, in a polarizing plate for antireflection including a protective layer having high in-plane retardation and a non-aligned optical axis, since the protective layer reduces an aligned state of linearly polarized light even upon transmission of light through the protective layer to the polarizer, the optical characteristics of the polarizing plate, particularly crossed optical characteristics measured with a low quantity of light, cannot be measured with high reliability.

For polarizing plates for liquid crystal displays (LCDs), the crossed optical characteristics have a very high correlation with brightness and colors in a black mode. In particular, since a contrast ratio has a very high correlation with spectrum of crossed transmittance, it is important to perform accurate and reliable measurement of the corresponding performance such as the crossed optical characteristics. For polarizing plates for organic light emitting diodes (OLEDs), the crossed optical characteristics have a very high correlation with a reflected color that are included in the field of view. In particular, it is important to make accurate measurement of the crossed optical characteristics, since the crossed optical characteristics have a very high correlation with reflectivity. For the polarizing plates for OLEDs, inaccurate measurement of the crossed optical characteristics can make it very difficult to find and address problems when there is abnormality in reflection visibility of an OLED panel.

Typically, the optical characteristics of the polarizing plate having a retardation layer and a protective layer on both surfaces thereof are measured before each of the retardation layer and the protective layer is bonded to the polarizer. However, since this method makes it difficult to check variation in optical characteristics after each of the retardation layer and the protective layer is bonded to the polarizer, this method is not regarded as accurate. As such, when the optical characteristics of the antireflective polarizing plate including the retardation layer and the protective layer providing phase retardation on both surfaces of the polarizer are not suitably measured or measured with low reliability, it is difficult for both a provider and a user to provide or use a polarizing plate having desired specifications. Further, when there is a problem with contrast ratio and/or reflectivity closely related to a use environment of the polarizing plate, it is very difficult to find a solution to the problem.

The background technique of the present invention is disclosed in Korean Patent Laid-open Publication No. 10-2013-0103595 and the like.

SUMMARY

According to an aspect of embodiments of the present invention a polarizing plate for antireflection, having good durability under high temperature/humidity conditions, is provided.

According to another aspect of embodiments of the present invention, a polarizing plate for antireflection allowing improvement in accuracy of measurement of crossed optical characteristics is provided.

Aspects of one or more embodiments of the present invention relate to a polarizing plate.

According to one or more embodiments, a polarizing plate includes: a polarizer; a protective layer stacked on a surface of the polarizer; and a retardation layer stacked on another surface of the polarizer, wherein the protective layer has an in-plane retardation of 3,000 nm or more at a wavelength of 550 nm; an optical axis of the protective layer is tilted at an angle of −2° to +2° with respect to a light absorption axis of the polarizer; and the polarizer has a single transmittance of 44.0% or more and a minimum crossed transmittance of 0.005% or more at a wavelength of 400 nm to 700 nm.

In one or more embodiments, the protective layer may have a water vapor transmission rate of 30 $g/m^2 \cdot day$ or less.

In one or more embodiments, the optical axis may be a slow axis or a fast axis of the protective layer.

In one or more embodiments, the protective layer may comprise a protective film including at least one selected from among a polyester based resin, a cyclic olefin polymer based resin, and a (meth)acrylic based resin.

In one or more embodiments, the protective layer may further include an antireflection layer, a low reflectivity layer, an antiglare layer, a hard coating layer, a fingerprint resistant layer, or a primer layer on a surface thereof or on another surface thereof.

In one or more embodiments, the protective layer may have a reflectivity of 1% or less.

In one or more embodiments, the polarizer may have a maximum crossed transmittance at a wavelength of 480 nm to 550 nm in a wavelength range of 450 nm to 580 nm.

In one or more embodiments, the retardation layer may include a first retardation layer and a second retardation layer.

In one or more embodiments, an absolute value of a tilted angle of a slow axis of the first retardation layer with reference to the light absorption axis of the polarizer may be in a range of 10° to 30°.

In one or more embodiments, an absolute value of a tilted angle of a slow axis of the second retardation layer with reference to the light absorption axis of the polarizer may be in a range of 79° to 89°.

In one or more embodiments, an angle defined between the slow axis of the first retardation layer and the slow axis of the second retardation layer may be in a range of 49° to 79°.

In one or more embodiments, the first retardation layer may have an in-plane retardation of 210 nm to 270 nm at a wavelength of 550 nm, and the second retardation layer may have an in-plane retardation of 60 nm to 150 nm at a wavelength of 550 nm.

In one or more embodiments, the polarizing plate may have a deviation of the crossed optical characteristics of 10% or less, as calculated by the following Equation 3:

$$\text{Deviation of crossed optical characteristics}=|(A-B)/B|\times 100,$$

where A is a value of the crossed optical characteristics, as measured on the polarizing plate including the protective film stacked on an upper surface of the polarizer and having an optical axis, and B is a value of the crossed optical characteristics, as measured on a reference polarizing plate including a protective film stacked on the upper surface of the polarizer and having no optical axis.

Aspects of one or more embodiments of the present invention relate to an optical display apparatus.

In one or more embodiments, an optical display apparatus includes the polarizing plate according to an embodiment of the present invention.

According to an aspect, the present invention provides a polarizing plate for antireflection having good durability under high temperature/humidity conditions.

According to another aspect, the present invention provides a polarizing plate for antireflection allowing improvement in accuracy of measurement of crossed optical characteristics.

DETAILED DESCRIPTION

Figure 1:
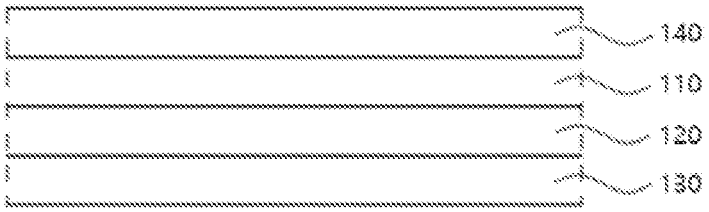
FIG. 1 is a cross-sectional view of a polarizing plate according to an embodiment of the present invention.

Herein, some embodiments of the present invention will be described in further detail with reference to the accompanying drawings such that the present invention can be easily implemented by those skilled in the art. It is to be understood that the present invention may be embodied in different ways and is not limited to the following embodiments.

In the drawings, components unrelated to description may be omitted for clear description of the invention, and like components are denoted by like reference numerals throughout the specification. Although lengths, thicknesses, or widths of various components may be exaggerated for understanding in the drawings, the present invention is not limited thereto.

Herein, spatially relative terms, such as "upper" and "lower," are defined with reference to the accompanying drawings. Thus, it is to be understood that the term "upper surface" can be used interchangeably with the term "lower surface," for example.

Herein, "in-plane retardation Re," "out-of-plane retardation Rth," and "degree of biaxiality NZ" are represented by Equations A, B, and C, respectively:

$$Re=(nx-ny)\times d; \quad \text{Equation A}$$

$$Rth=((nx+ny)/2-nz)\times d; \quad \text{Equation B}$$

$$NZ=(nx-nz)/(nx-ny), \quad \text{Equation C}$$

where nx, ny, and nz are indexes of refraction of a corresponding optical device in the slow axis direction, the fast axis direction, and the thickness direction of the optical device at a measurement wavelength, respectively, and d is the thickness of the optical device (unit: nm). In Equations A to C, the measurement wavelength may be 450 nm, 550 nm, or 650 nm.

Herein, "short wavelength dispersion" refers to Re(450)/Re(550) and "long wavelength dispersion" refers to Re(650)/Re(550), where Re(450), Re(550), and Re(650) refer to in-plane retardation (Re) of a single retardation layer or a laminate of retardation layers at wavelengths of about 450 nm, about 550 nm, and about 650 nm, respectively.

As used herein to represent an angle, "+" means the counterclockwise direction about a reference point and "−" means the clockwise direction about the reference point.

Herein, "water vapor transmission rate (WVTR)" means a value measured at 23° C. and 99% RH (relative humidity) to 100% RH by a typical method known to those skilled in the art. The water vapor transmission rate may be measured using a water vapor transmission rate tester (PERMATRAN-W, MODEL 700), but is not limited thereto. For measurement of the water vapor transmission rate of a protective layer, a specimen may be prepared by cutting the protective layer to a size of 10 cm×10 cm (length×width).

Herein, "(meth)acryl" refers to acryl and/or methacryl.

As used herein to represent a specific numerical range, "X to Y" means "greater than or equal to X and less than or equal to Y (X≤ and ≤Y)."

A polarizing plate according to one or more embodiments of the present invention includes: a polarizer; a protective layer stacked on a surface of the polarizer; and a retardation layer stacked on another surface of the polarizer, wherein the protective layer has an in-plane retardation of 3,000 nm or more at a wavelength of 550 nm, an optical axis of the protective layer is tilted at an angle of −2° to +2° with respect to a light absorption axis of the polarizer, and the polarizer has a single transmittance of 44.0% or more and a minimum crossed transmittance of 0.005% or more at a wavelength of 400 nm to 700 nm.

Single transmittance of the polarizer may be a value measured at a wavelength of 380 nm to 780 nm, for example, an average value.

Single transmittance and crossed transmittance of the polarizer may be measured using a UV-VIS spectrophotometer (for example: V-7100, JASCO) by a typical method known to those skilled in the art.

The inventors of the present invention developed a polarizing plate for antireflection that includes a polarizer, a retardation layer interposed between the polarizer and an optical display panel (for example, an organic light emitting diode panel), and, in an embodiment, between the polarizer and an adhesive layer (used to stack the polarizing plate on the optical display panel), and a protective layer stacked on the polarizer to face the retardation layer, in which the protective layer has a low water vapor transmission rate to provide good durability under high temperature/humidity conditions, whereby the polarizing plate can secure high accuracy in measurement of optical characteristics of the polarizing plate, particularly crossed optical characteristics, even when the protective layer has in-plane retardation in a predetermined range at a wavelength of 550 nm. By securing high accuracy in measurement of the crossed optical characteristics of the polarizing plate, the polarizing plate according to the present invention can satisfy both a provider and a user who want to provide or use a polarizing plate having desired specifications with certainty or substantial certainty. In addition, when there is a problem with contrast ratio and/or reflectivity closely related to a use environment of the polarizing plate, the polarizing plate allows easy resolution of the problem.

According to the present invention, durability of the polarizing plate under high temperature/humidity conditions is evaluated according to the following Equations 1 and 2. In one or more embodiments, a variation of single transmittance of the polarizing plate according to Equation 1 may have an absolute value of 0.5% or less, and, in an embodiment, 0%, 0.05%, 0.1%, 0.15%, 0.2%, 0.25%, 0.3%, 0.35%, 0.4%, 0.45%, or 0.5%, for example, 0% to 0.3%, and a variation of a degree of polarization of the polarizing plate according to Equation 2 may have an absolute value of 0.05% or less, and, in an embodiment, 0%, 0.01%, 0.02%, 0.03%, 0.04%, or 0.05%, for example, 0% to 0.03%. Within this range, the polarizing plate can have high reliability to secure good screen quality of an optical display apparatus while improving lifespan thereof.

$$\text{Variation of single transmittance of polarizing plate} = Ts(2) - Ts(1), \quad \text{Equation 1}$$

where Ts(1) is an initial single transmittance of the polarizing plate (unit: %), and Ts(2) is a single transmittance of the polarizing plate (unit: %) after the polarizing plate is left at 60° C. and 95% RH (relative humidity) for 1,000 hours.

$$\text{Variation of a degree of a polarization of polarizing plate} = PE(2) - PE(1), \quad \text{Equation 2}$$

where PE(1) is an initial degree of polarization of the polarizing plate (unit: %), and PE(2) is a degree of polarization of the polarizing plate (unit: %) after the polarizing plate is left at 60° C. and 95% RH for 1,000 hours.

In an embodiment, each of Ts(1) and Ts(2) in Equation 1 may be 44.0% or more, and, in an embodiment, 44.0%, 44.5%, 45.0%, 45.5%, 46.0%, 46.5%, 47.0%, 47.5%, 48.0%, 48.5%, or 49.0%, for example, 44.0% to 49.0%.

In an embodiment, each of PE(1) and PE(2) in Equation 2 may be 93.0% or more, and, in an embodiment, 93.0%, 93.5%, 94.0%, 94.5%, 95.0%, 95.5%, 96.0%, 96.5%, 97.0%, 97.5%, 98.0%, 98.5%, 99.0%, 99.5%, or 99.99%, for example, 93.0% to 99.99%.

According to the present invention, to evaluate improvement in accuracy of measurement of the crossed optical characteristics of the polarizing plate, a deviation of the crossed optical characteristics calculated according to the following Equation 3 is used. Among the optical characteristics of the polarizing plate, the crossed optical characteristics of the polarizing plate are important in terms of confirming that factors closely related to a user environment, such as contrast ratio and reflectivity, are applied as designed, and in terms of discovering a resolution of a problem that can occur.

In an embodiment, a deviation of the crossed optical characteristics of the polarizing plate according to Equation 3 may be 10% or less, and, in an embodiment, 0%, 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9%, 5%, 5.1%, 5.2%, 5.3%, 5.4%, 5.5%, 5.6%, 5.7%, 5.8%, 5.9%, 6%, 6.1%, 6.2%, 6.3%, 6.4%, 6.5%, 6.6%, 6.7%, 6.8%, 6.9%, 7%, 7.1%, 7.2%, 7.3%, 7.4%, 7.5%, 7.6%, 7.7%, 7.8%, 7.9%, 8%, 8.1%, 8.2%, 8.3%, 8.4%, 8.5%, 8.6%, 8.7%, 8.8%, 8.9%, 9%, 9.1%, 9.2%, 9.3%, 9.4%, 9.5%, 9.6%, 9.7%, 9.8%, 9.9%, or 10%, for example, 0% to 8%. Within this range, it can be determined that the polarizing plate secures accuracy in measurement of the crossed optical characteristics.

$$\text{Deviation of crossed optical characteristics} = |(A-B)/B| \times 100, \quad \text{Equation 3}$$

where A is a value of the crossed optical characteristics, as measured on a polarizing plate including a protective layer stacked on the upper surface of the polarizer and having an optical axis, and B is a value of the crossed optical characteristics, as measured on a polarizing plate (reference polarizing plate) including a protective layer stacked on the upper surface of the polarizer and having no optical axis.

The reference polarizing plate includes: a polarizer, which has the same single transmittance and the same minimum crossed transmittance at a wavelength of 400 nm to 700 nm as a polarizer of a polarizing plate to be measured; a retardation layer stacked on a surface of the polarizer and having the same configuration (for example, retardation and/or material as the retardation layer of the polarizing plate to be measured; and a protective film stacked on another surface of the polarizer and including a triacetylcellulose film (having no optical axis) having an in-plane retardation of 0 nm to 5 nm, and, in an embodiment, 0 nm, at a wavelength of 550 nm.

In evaluation by Equation 3, the protective film of the reference polarizing plate may be a triacetylcellulose film or may be a laminate of the triacetylcellulose film and an antireflection film. Since the triacetylcellulose film is a non-stretched film, the triacetylcellulose film generally does not have an optical axis in an in-plane direction.

In Equation 3, the crossed optical characteristics are values measured on a target polarizing plate and may include a crossed transmittance Tc, a luminance Lc, a color value ac, and a color value bc. The crossed optical characteristics may be measured with respect to the target polarizing plate disposed such that a light absorption axis of a polarizer of the target polarizing plate is orthogonal to a light absorption axis of a reference polarizer disposed in a UV-VIS spectrophotometer. The color value ac and the color value bc may be obtained from the CIE coordinate system in which the x-axis indicating the a value is orthogonal to the y-axis indicating the b value. Increase in absolute value of the color value ac in a positive direction means that the color becomes red, increase in absolute value of the color value ac in a negative direction means that the color becomes green, increase in absolute value of the color value bc in the positive direction means that the color becomes yellow, and increase in absolute value of the color value bc in the negative direction means that the color becomes blue. The crossed optical characteristics may be measured by transmitting light at a protective layer side to pass through the protective layer, the polarizer, and the retardation layer in the stated order.

In Equation 3, accuracy in measurement of the optical characteristics is evaluated based on the ratio of the optical characteristics of the polarizing plate to the optical characteristics of the reference polarizing plate. The reference polarizing plate means a polarizing plate that includes an isotropic film as a protective film on a surface of the polarizer having a specific transmittance and a retardation layer stacked on another surface of the polarizer and allowing measurement of the optical characteristics by a typical method without abnormality. The reason for use of Equation 3 is that the crossed optical characteristics of the polarizer can be clearly measured due to the absence of in-plane retardation and an optical axis in the protective layer capable of transmitting light therethrough, unlike a polarizing plate which makes it difficult to determine whether a measured value is a true value or has an error due to use of the retardation layer on a protective surface. As compared with a value measured on the reference polarizing plate, when a value obtained using the retardation film on the protective surface has a single-digit error, the value is significant and can be considered to exhibit the same characteristics.

Next, a polarizing plate according to an embodiment of the present invention will be described with reference to FIG. 1.

Referring to FIG. 1, a polarizing plate according to an embodiment includes a polarizer 110, a protective layer 140 stacked on a first surface of the polarizer 110, and a retardation layer stacked on a second surface of the polarizer 110. The retardation layer includes a first retardation layer 120 and a second retardation layer 130 sequentially stacked in the stated order on the second surface of the polarizer 110.

The retardation layer may be interposed between the polarizer and an optical display panel (for example, an organic light emitting diode panel). As a result, the retardation layer may be stacked on a light incidence surface of the polarizer with respect to internal light emitted from the optical display panel. By including the retardation layer described below, the polarizing plate may be used as a polarizing plate for antireflection.

Protective Layer

When the polarizing plate is mounted on the optical display panel, the protective layer 140 is placed at the outermost side of the polarizing plate and allows external light to reach the polarizer therethrough. The protective layer 140 may be stacked on the outermost side of the polarizing plate to protect the polarizing plate.

In an embodiment, the protective layer 140 may have a water vapor transmission rate of 30 $g/m^2 \cdot day$ or less, and, in an embodiment, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 $g/m^2 \cdot day$, for example, 5 $g/m^2 \cdot day$ to 20 $g/m^2 \cdot day$. Within this range, the polarizing plate can reach the ranges of the present invention related to Equations 1 and 2.

The protective layer 140 may include a protective film or a protective coating layer including a resin having the above water vapor transmission rate. In an embodiment, the protective layer may be a protective film due to the use of a stretching process for improvement in screen quality and the like.

In an embodiment, the protective layer 140 may be a non-cellulose based protective film or a protective coating layer including the resin. The resin may include at least one selected from among polyester based resins including polyethylene terephthalate, polyethylene naphthalate, polybutylene terephthalate, polybutylene naphthalate, and the like, cyclic olefin polymer based resins, and (meth)acrylic based resins. In an embodiment, the protective layer is a polyethylene terephthalate based film in consideration of ease of surface treatment, price and physical properties.

In an embodiment, the protective layer 140 has birefringence to have an in-plane retardation of 3,000 nm or more at a wavelength of 550 nm. Within this range, the polarizing plate can be applied to an optical display apparatus without deterioration in screen quality. In particularly, even with birefringence, the protective layer can minimize or reduce appearance of rainbow spots due to rainbow mura. In an embodiment, the protective layer may have an in-plane retardation of 3,000 nm, 3,500 nm, 4,000 nm, 4,500 nm, 5,000 nm, 5,500 nm, 6,000 nm, 6,500 nm, 7,000 nm, 7,500 nm, 8,000 nm, 8,500 nm, 9,000 nm, 9,500 nm, 10,000 nm, 10,500 nm, 11,000 nm, 11,500 nm, 12,000 nm, 12,500 nm, 13,000 nm, 13,500 nm, 14,000 nm, 14,500 nm, or 15,000 nm, for example, 4,000 nm to 15,000 nm, or 5,000 nm to 12,000 nm, at a wavelength of 550 nm. Within this range, the protective layer can improve screen quality in combination with the retardation layer described below.

In an embodiment, the protective layer 140 may have an out-of-plane retardation of 15,000 nm or less at a wavelength of 550 nm. Within this range, the polarizing plate can be applied to an optical display apparatus without deterioration in screen quality. In particular, when the protective layer is a polyester based resin film including polyethylene terephthalate, the protective layer can minimize or reduce appearance of rainbow spots due to rainbow mura. In an embodiment, the protective layer may have an out-of-plane retardation of 3,000 nm, 3,500 nm, 4,000 nm, 4,500 nm, 5,000 nm, 5,500 nm, 6,000 nm, 6,500 nm, 7,000 nm, 7,500 nm, 8,000 nm, 8,500 nm, 9,000 nm, 9,500 nm, 10,000 nm, 10,500 nm, 11,000 nm, 11,500 nm, 12,000 nm, 12,500 nm, 13,000 nm, 13,500 nm, 14,000 nm, 14,500 nm, or 15,000 nm, for example, 4,000 nm to 15,000 nm, or 5,000 nm to 12,000 nm, at a wavelength of 550 nm, Within this range, the protective layer can improve screen quality in combination with the retardation layer described below.

In an embodiment, the protective layer 140 may have a degree of biaxiality of 2.0 or less at a wavelength of 550 nm. Within this range, the polarizing plate can be applied to an optical display apparatus without deterioration in screen quality. In particular, when the protective layer is a polyester based resin film including polyethylene terephthalate, the protective layer can minimize or reduce appearance of rainbow spots due to rainbow mura. In an embodiment, the protective layer may have a degree of biaxiality of 1.0, 1.1, 1.2, 1.3, 1.4, 1.5, 1.6, 1.7, 1.8, 1.9, or 2.0, for example, 1.0 to 2.0, or 1.1 to 1.8, at a wavelength of 550 nm. Within this range, the protective layer can improve screen quality in combination with the retardation layer described below.

The protective layer 140 may be formed by stretching in order to have in-plane retardation within the above range. As a result, the protective layer has an optical axis in an in-plane direction thereof.

The optical axis of the protective layer 140 may be a slow axis and a fast axis in the in-plane direction. The slow axis is defined as an axis of the protective layer providing the highest index of refraction in the in-plane direction, and the fast axis is defined as an axis of the protective layer providing the lowest index of refraction in the in-plane direction.

In an embodiment, the protective layer may be a film having the slow axis corresponding to a transverse direction (TD) of the protective layer and the fast axis corresponding to a machine direction (MD) of the protective layer. In another embodiment, the protective layer may be a film having the slow axis corresponding to the MD of the protective layer and the fast axis corresponding to the TD of the protective layer. In a further embodiment, both the slow axis and the fast axis of the protective layer may be oblique directions between the MD and the TD of the protective layer.

In an embodiment, when the protective layer is a polyester based film including polyethylene terephthalate and the like, the protective layer is a film having the slow axis corresponding to the TD of the protective layer and the fast axis corresponding to the MD of the protective layer, thereby enabling easy realization of the effects of the present invention while improving screen quality when stacked on the retardation layer described below.

The optical axis of the protective layer 140 may be tilted at an angle of −2° to +2° with respect to the light absorption axis of the polarizer. Here, "optical axis" may be the fast axis or the slow axis, and, in an embodiment, the fast axis.

According to the present invention, as one factor for improving accuracy in measurement of the crossed optical characteristics of the polarizing plate, the angle between the optical axis of the protective layer and the light absorption axis of the polarizer is adjusted in the range of −2° to +2°. When the protective layer has in-plane retardation within the above range, the polarizing plate can improve accuracy in measurement of the crossed optical characteristics. The angle between the optical axis of the protective layer and the light absorption axis of the polarizer within this range may be realized through adjustment of the angle between the optical axis of the protective layer and the light absorption axis of the polarizer upon bonding of the protective layer to the polarizer. In an embodiment, the angle between the optical axis of the protective layer and the light absorption axis of the polarizer is −2°, −1.9°, −1.8°, −1.7°, −1.6°, −1.5°, −1.4°, −1.3°, −1.2°, −1.1°, −1.0°, −0.9°, −0.8°, −0.7°, −0.6°, −0.5°, −0.4°, −0.3°, −0.2°, −0.1°, 0°, +0.1°, +0.2°, +0.3°, +0.4°, +0.5°, +0.6°, +0.7°, +0.8°, +0.9°, +1.0°, +1.1°, +1.2°, +1.3°, +1.4°, +1.5°, +1.6°, +1.7°, +1.8°, +1.9°, or +2°.

In an embodiment, the protective layer 140 may be formed by preparing a non-stretched film through melt extrusion of a composition for the protective layer and stretching the non-stretched film to 5 times to 8 times an initial length thereof in the TD, and, in an embodiment, 5 times to 7 times, followed by heat setting. The protective layer may be a protective film having the slow axis corresponding to the TD of the protective layer and the fast axis corresponding to the MD of the protective layer.

The protective layer 140 may further include a functional coating layer on a surface thereof or on another surface thereof. The functional coating layer may provide an additional function to the protective layer. The functional coating layer may be an antireflection layer, a low reflectivity layer, an antiglare layer, a hard coating layer, a fingerprint resistant layer, or a primer layer, and, in an embodiment, an antireflection layer, a low reflectivity layer, or an antiglare layer.

In an embodiment, the protective layer may have a reflectivity of 1% or less, and, in an embodiment, 0%, 0.1%, 0.2%, 0.3%, 0.4%, 0.5%, 0.6%, 0.7%, 0.8%, 0.9%, or 1%, for example, 0% to 1%. Within this range, the protective layer can further improve an antireflection effect. Embodiments of the present invention can improve accuracy in measurement of the crossed optical characteristics in a polarizing plate having a reflectivity of 1% or less. Here, reflectivity may be measured by a typical method known to those skilled in the art or may be obtained with reference to commercially available catalogues.

Polarizer

The polarizer 110 converts natural light or polarized light into polarized light through linear polarization in a certain direction. The polarizer has a light absorption axis substantially in the same direction as the MD (machine direction) of the polarizer. A light transmission axis of the polarizer is substantially orthogonal to the light absorption axis of the polarizer.

In an embodiment, the polarizer 110 has a single transmittance of 44.0% or more and a minimum crossed transmittance of 0.005% or more at a wavelength of 400 nm to 700 nm. According to the present invention, as another factor for improving accuracy in measurement of the crossed optical characteristics of the polarizing plate, the single transmittance of the polarizer is adjusted to 44.0% or more and the minimum crossed transmittance of the polarizer is adjusted to 0.005% or more at a wavelength of 400 nm to 700 nm. Within this range, the polarizer allows improvement in accuracy of measurement of the crossed optical characteristics of the polarizing plate.

In an embodiment, the polarizer may have a single transmittance of 44.0%, 44.1%, 44.2%, 44.3%, 44.4%, 44.5%, 44.6%, 44.7%, 44.8%, 44.9%, 45%, 45.1%, 45.2%, 45.3%, 45.4%, 45.5%, 45.6%, 45.7%, 45.8%, 45.9%, 46%, 46.1%, 46.2%, 46.3%, 46.4%, 46.5%, 46.7%, 46.8%, 46.9%, 47%, 47.1%, 47.2%, 47.3%, 47.4%, 47.5%, 47.6%, 47.7%, 47.8%, 47.9%, 48%, 48.5%, 49%, 49.5%, or 50%, for example, 44.0% to 50%, and, in an embodiment, 44.0% to 48%, and, in an embodiment, 44.0% to 46%. Within this range, the polarizer allows improvement in accuracy of measurement of the crossed optical characteristics of the polarizing plate and can easily realize an antireflection function in combination with the retardation layer.

In an embodiment, the polarizer may have a minimum crossed transmittance of 0.005% to 5%, and, in an embodiment, 0.005%, 0.0051%, 0.0052%, 0.0053%, 0.0054%, 0.0055%, 0.0056%, 0.0057%, 0.0058%, 0.0059%, 0.006%, 0.0061%, 0.0062%, 0.0063%, 0.0064%, 0.0065%, 0.0066%, 0.0067%, 0.0068%, 0.0069%, 0.007%, 0.008%, 0.009%, 0.01%, 0.05%, 0.1%, 0.2%, 0.3%, 0.4%, 0.5%, 0.6%, 0.7%, 0.8%, 0.9%, 1%, 2%, 3%, 4%, or 5%, and, in an embodiment, 0.005% to 2%, and, in an embodiment, 0.005% to 0.5%, and, in an embodiment, 0.005% to 0.2%, at a wavelength of 400 nm to 700 nm. Within this range, the polarizer allows improvement in accuracy of measurement of the crossed optical characteristics of the polarizing plate and can easily realize an antireflection function in combination with the retardation layer.

The crossed transmittance of the polarizer 110 may be represented in a smooth W shape at a wavelength of 400 nm to 700 nm.

Figure 2A:
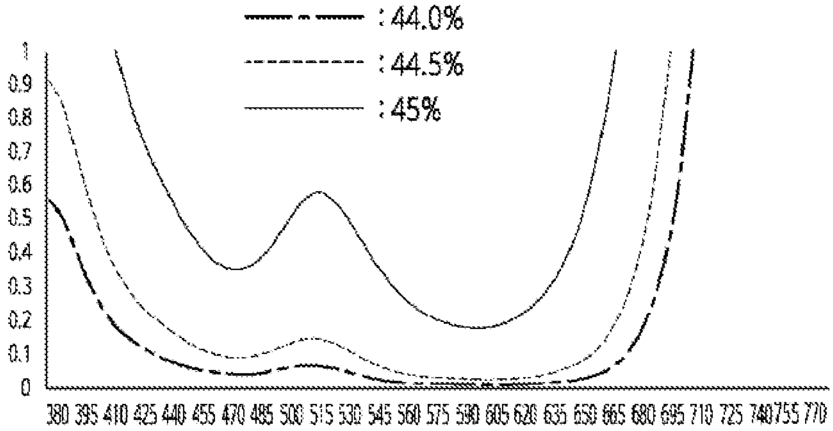
FIGS. 2A and 2B are graphs depicting a crossed transmittance of a polarizer depending on wavelength, in which the X-axis shows the wavelength (unit: nm), the Y-axis shows the crossed transmittance of the polarizer (unit: %), and a dot-dashed line, a dotted line, and a solid line are crossed transmittances of polarizers having single transmittances of 44.0%, 44.5%, and 45%, respectively.
Figure 2B:
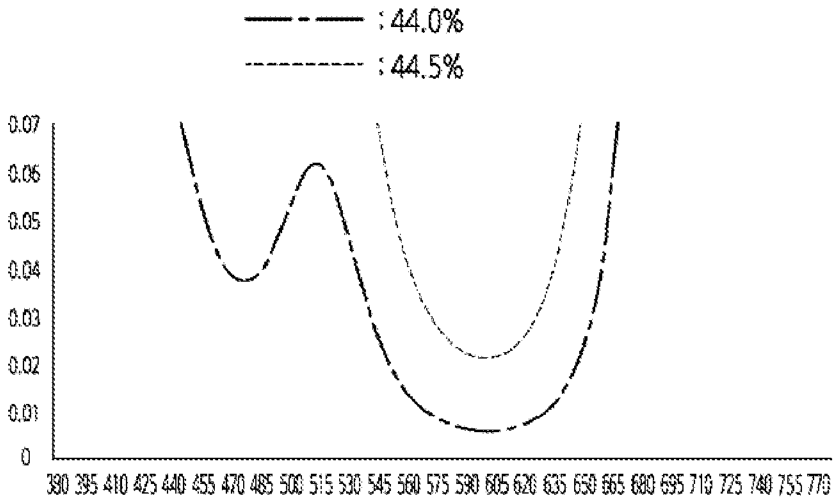

FIGS. 2A and 2B are graphs depicting a crossed transmittance of the polarizer according to the present invention depending on wavelength.

Referring to FIG. 2A, when the polarizer has a single transmittance of 44.0% to 45%, and, in an embodiment, 44.0%, 44.5%, or 45%, the crossed transmittance of the polarizer 110 has a smooth W shape in the wavelength range of 400 nm to 700 nm, indicating that the polarizer according to the present invention has the minimum crossed transmittance within a predetermined range in the wavelength range 400 nm to 700 nm. FIG. 2B shows an enlarged graph of the crossed transmittance of the polarizer having a crossed transmittance or 44.0% or 44.5%.

In a wavelength range of 450 nm to 580 nm, the polarizer 110 may have a maximum crossed transmittance at a wavelength of 480 nm to 550 nm, and, in an embodiment, 480 nm, 485 nm, 490 nm, 495 nm, 500 nm, 505 nm, 510 nm, 515 nm, 520 nm, 525 nm, 530 nm, 535 nm, 540 nm, 545 nm, or 550 nm, and, in an embodiment, 500 nm to 530 nm.

In the wavelength range of 400 nm to 700 nm, the polarizer 110 may have the minimum crossed transmittance at a wavelength of 500 nm to 650 nm, and, in an embodiment, 500 nm, 505 nm, 510 nm, 515 nm, 520 nm, 530 nm, 535 nm, 540 nm, 545 nm, 550 nm, 555 nm, 560 nm, 565 nm, 570 nm, 575 nm, 580 nm, 585 nm, 590 nm, 595 nm, 600 nm, 605 nm, 610 nm, 615 nm, 620 nm, 625 nm, 630 nm, 635 nm, 640 nm, 645 nm, or 650 nm, for example, 550 nm to 650 nm, and, in an embodiment, 570 nm to 640 nm.

In an embodiment, the polarizer 110 may have a degree of polarization of 99% or more, for example, 99% to 99.999%. Within this range, the polarizer can improve antireflection performance in combination with the retardation layer.

In an embodiment, the polarizer 110 may have a thickness of 2 μm to 30 μm, and, in an embodiment, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, or 30 μm, for example, 4 μm to 25 μm. Within this range, the polarizer can be used in the polarizing plate.

The single transmittance and the crossed transmittance of the polarizer 110 may be realized through adjustment of the kind of polyvinyl alcohol film, stretching ratio, stretching temperature, the kind of dyeing material and/or the content thereof, and the like in manufacture of the polarizer.

The polarizer may be manufactured from a polymer film mainly consisting of a polyvinyl alcohol based resin. In an embodiment, the polarizer may be manufactured by dyeing the polymer film with iodine or dichroic dyes, followed by stretching the polymer film in the MD. In an embodiment, the polarizer may be fabricated through swelling, dyeing, stretching, and crosslinking.

Next, a method of manufacturing the polarizer will be described in further detail.

A process of preparing a polyvinyl alcohol based film dyed with at least one dichroic material selected from among iodine and dichroic dyes and stretched will be described.

The dyed and stretched polyvinyl alcohol film may be prepared by dyeing and stretching the polyvinyl alcohol based film. In the method of manufacturing the polarizer according to the present invention, dyeing and stretching may be performed in any sequence. That is, the polyvinyl alcohol based film may be dyed and then stretched or vice versa, or may be concurrently (e.g., simultaneously) subjected to dyeing and stretching.

The polyvinyl alcohol based film may be a typical polyvinyl alcohol based film known to those skilled in the art. In an embodiment, the polyvinyl alcohol based film includes a film containing a hydrophilic functional group and a hydrophobic functional group. The hydrophobic functional group may be present together with a hydroxyl group (OH group), which is a hydrophilic functional group, in the polyvinyl alcohol based film. The polarizer according to the present invention can be easily manufactured using the polyvinyl alcohol based film containing both the hydrophilic functional group and the hydrophobic functional group.

The hydrophobic functional group is present in at least one of a main chain and a sidechain of the polyvinyl alcohol based resin forming the polyvinyl alcohol based film. Here, "main chain" refers to a portion forming a main backbone of the polyvinyl alcohol based resin, and "sidechain" refers to a backbone connected to the main chain. In an embodiment, the hydrophobic functional group is present in the main chain of the polyvinyl alcohol based resin.

The polyvinyl alcohol based resin containing the hydrophilic functional group and the hydrophobic functional group may be prepared through polymerization of at least one vinyl ester monomer, such as vinyl acetate, vinyl formate, vinyl propionate, vinyl butyrate, vinyl pivalate, isopropenyl acetate, and the like, and a monomer providing the hydrophobic functional group. In an embodiment, the vinyl ester monomer includes vinyl acetate. The monomer providing the hydrophobic functional group may include a monomer providing a hydrocarbon repeat unit including ethylene, propylene, and the like.

The polyvinyl alcohol based film may be produced from polyvinyl alcohol or derivatives thereof and may have a degree of polymerization of 1,000 to 5,000 and a degree of saponification of 80 mol % to about 100 mol %. In an embodiment, the polyvinyl alcohol based film may have a thickness of 1 μm to 30 μm, and, in an embodiment, 3 μm to 30 μm. Within this range, the polyvinyl alcohol based film can be used in manufacture of a thin polarizer.

The polyvinyl alcohol based film may be subjected to washing with water and swelling before dyeing and stretching. The polyvinyl alcohol based film may be subjected to washing with water to remove foreign matter from the surface of the polyvinyl alcohol based film. The polyvinyl alcohol based film may be subjected to swelling to allow more efficient dyeing or stretching of the polyvinyl alcohol based film. Swelling may be realized by leaving the polyvinyl alcohol based film in an aqueous solution of a swelling bath, as well-known to those skilled in the art. The temperature of the swelling bath and swelling time are not particularly limited. The swelling bath may further include boric acid, an inorganic acid, a surfactant, and the like, and the content of these components may be adjusted.

The polyvinyl alcohol based film may be dyed by dipping the polyvinyl alcohol based film in a dyeing bath containing iodine and/or dichroic dyes. In the dyeing process, the polyvinyl alcohol film is dipped in a dyeing solution. The dyeing solution may be an aqueous solution containing iodine and/or dichroic dyes. In an embodiment, iodine is provided in the form of an iodine-based dye, which may include at least one selected from among potassium iodide, hydrogen iodide, lithium iodide, sodium iodide, zinc iodide, lithium iodide, aluminum iodide, lead iodide, and copper iodide.

The dying solution may be an aqueous solution containing 1 wt % to 5 wt % of at least one of iodine and/or dichroic dyes. Within this range, the polarizer has a degree of polarization within a range (e.g., a predetermined range) to be used in a display apparatus.

In an embodiment, the dying solution may be an aqueous solution containing 1 wt % to 5 wt % of potassium iodide. Within this range, the polarizer can facilitate realization of the effects of the present invention by securing the degree of polarization and the concentration of potassium iodide within certain ranges (e.g., predetermined ranges).

The dyeing bath may have a temperature of 20° C. to 45° C. and the polyvinyl alcohol based film may be dipped in the dyeing bath for 10 seconds to 300 seconds. Within this range, the polarizer can facilitate realization of the effects of the present invention by securing the degree of polarization and the concentration of potassium iodide within certain ranges (e.g., predetermined ranges).

The dyed polyvinyl alcohol based film may be stretched in a stretching bath to exhibit polarization through alignment of iodine and/or dichroic dyes. In an embodiment, stretching may be realized by dry stretching and wet stretching. Dry stretching may be performed by inter-roll stretching, compression stretching, hot-roll stretching, and the like, and wet stretching may be performed in a wet stretching bath containing water at 35° C. to 65° C. The wet stretching bath may further contain boric acid to improve the stretching effect.

In an embodiment, the wet stretching bath may be an aqueous solution containing 5 wt % or less (0 wt % to 5 wt %), and, in an embodiment, 1 wt % to 5 wt %, of potassium iodide, and 5 wt % or less (0 wt % to 5 wt %), and, in an embodiment, 1 wt % to 5 wt %, of boric acid. Within this range, the polarizer can facilitate realization of the effects of the present invention by securing the degree of polarization and the concentration of potassium iodide within certain ranges (e.g., predetermined ranges).

The polyvinyl alcohol based film may be stretched at a certain stretching ratio, and, in an embodiment, a total stretching ratio of 5 times to 7 times, and, in an embodiment, 5.5 times to 6.5 times. Within this range, the polyvinyl alcohol based film can prevent or substantially prevent cutting, wrinkling, and the like upon stretching, and can realize a polarizer achieving improvement in polarization degree and transmittance. Stretching may be performed by uniaxial stretching through single-stage stretching or multi-stage stretching, such as bi-stage stretching and tri-stage stretching, thereby preventing or substantially preventing fracture of the polyvinyl alcohol based film in manufacture of a thin polarizer.

Although dyeing and stretching of the polyvinyl alcohol based film are performed in the stated sequence in the above embodiment, dyeing and stretching may be performed in the same reaction bath.

Before or after the dyed polyvinyl alcohol based film is stretched, the polyvinyl alcohol based film may be subjected to crosslinking in a crosslinking bath. Crosslinking is a process that allows the polyvinyl alcohol based film to be more strongly dyed with iodine and/or dichroic dyes, and may be performed using boric acid as a crosslinking agent. To enhance the crosslinking effect, the crosslinking bath may further contain a phosphoric acid compound, potassium iodide, or the like.

In an embodiment, the crosslinking bath may be an aqueous solution containing 5 wt % or less (0 wt % to 5 wt %), and, in an embodiment, 1 wt % to 5 wt %, of boric acid. Within this range, the polarizer can facilitate realization of the effects of the present invention by securing the degree of polarization and the concentration of potassium iodide within certain ranges (e.g., predetermined ranges). In an embodiment, the crosslinking bath may have a temperature of 20° C. to 45° C.

The dyed and stretched polyvinyl alcohol based film may be subjected to color correction in a color correction bath. In color correction, the dyed and stretched polyvinyl alcohol based film is dipped in the color correction bath filled with a color correction solution containing potassium iodide. As a result, the polarizer has reduced color values and iodine cations ($I^-$) are removed from the polarizer, thereby improving durability. The color correction bath may have a temperature of 20° C. to 45° C., and the polyvinyl alcohol film may be dipped therein for 10 seconds to 300 seconds.

Retardation Layer

The retardation layer may be stacked between the polarizer and a panel to provide an antireflection function with respect to external light. The polarizing plate according to the present invention includes the retardation layer described below to improve accuracy in measurement of the optical characteristics, for example, crossed optical characteristics.

The retardation layer may include a laminate of retardation layers including a first retardation layer 120 and a second retardation layer 130 sequentially stacked on a lower surface of the polarizer 110. In an embodiment, the first retardation layer 120 may have an in-plane retardation (Re) of 210 nm to 270 nm at a wavelength of 550 nm, and the second retardation layer 130 may have an in-plane retardation of 80 nm to 130 nm at a wavelength of 550 nm. Within this range, the retardation layer can reduce reflectivity at both a front side and a lateral side and can make a reflected color black to facilitate improvement in screen quality.

The first retardation layer 120 may have an in-plane retardation of 210 nm to 270 nm at a wavelength of 550 nm. Within this range, the retardation layer can reduce reflectivity at both a front side and a lateral side and can facilitate improvement in screen quality through improvement in black visibility at the front side. In an embodiment, the first retardation layer may have an in-plane retardation of 210 nm, 215 nm, 220 nm, 225 nm, 230 nm, 235 nm, 240 nm, 245 nm, 250 nm, 255 nm, 260 nm, 265 nm, or 270 nm, and, in an embodiment, 215 nm to 265 nm, or 220 nm to 260 nm, at a wavelength of 550 nm.

In an embodiment, the first retardation layer 120 exhibits positive dispersion and may have a short wavelength dispersion of 1 to 1.1 and a long wavelength dispersion of 0.96 to 1. Within this range, the first retardation layer can reduce reflectivity at both a front side and a lateral side in use of the polarizing plate. In an embodiment, the first retardation layer has a short wavelength dispersion of 1 to 1.1, and, in an embodiment, greater than 1 to 1.1, and a long wavelength dispersion of 0.97 to 1, and, in an embodiment, 0.97 to less than 1.

In an embodiment, the first retardation layer 120 may have an in-plane retardation of 220 nm to 310 nm, and, in an embodiment, 225 nm to 305 nm, and, in an embodiment, 235 nm to 295 nm, at a wavelength of 450 nm, and an in-plane retardation of 180 nm to 255 nm, and, in an embodiment, 190 nm to 250 nm, and, in an embodiment, 200 nm to 240 nm, at a wavelength of 650 nm. Within this range, the first retardation layer 120 can easily achieve the short wavelength dispersion and the long wavelength dispersion.

In an embodiment, the first retardation layer 120 may have a positive (+) out-of-plane retardation at a wavelength of 550 nm, for example, an out-of-plane retardation of 100 nm to 300 nm, and, in an embodiment, 100 nm, 105 nm, 110 nm, 115 nm, 120 nm, 125 nm, 130 nm, 135 nm, 140 nm, 145 nm, 150 nm, 155 nm, 160 nm, 165 nm, 170 nm, 175 nm, 180 nm, 185 nm, 190 nm, 195 nm, 200 nm, 205 nm, 210 nm, 215 nm, 220 nm, 225 nm, 230 nm, 235 nm, 240 nm, 245 nm, 250 nm, 255 nm, 260 nm, 265 nm, 270 nm, 275 nm, 280 nm, 285 nm, 290 nm, 295 nm, or 300 nm, and, in an embodiment, 110 nm to 280 nm, and, in an embodiment, 120 nm to 260 nm, at a wavelength of 550 nm. Within this range, the first retardation layer 120 can improve lateral reflectivity.

In an embodiment, the first retardation layer 120 may have a positive (+) degree of biaxiality at a wavelength of 550 nm, for example, a degree of biaxiality of 1.0 to 2.5, and, in an embodiment, 1.0, 1.1, 1.2, 1.3, 1.4, 1.5, 1.6, 1.7, 1.8, 1.9, 2.0, 2.1, 2.2, 2.3, 2.4, or 2.5, and, in an embodiment, 1.01 to 1.5, at a wavelength of 550 nm. Within this range, the first retardation layer 120 can improve lateral reflectivity.

The first retardation layer 120 may be a liquid crystal layer or a non-liquid crystal layer. The "non-liquid crystal layer" may mean a layer that is not formed of at least one of a liquid crystal monomer, a liquid crystal oligomer, and a liquid crystal polymer or is formed of a material that is not converted into a liquid crystal monomer, a liquid crystal oligomer, or a liquid crystal polymer by light irradiation.

The first retardation layer 120 may include a resin having positive (+) birefringence. Here, "positive (+) birefringence" means that a transparent film having birefringence characteristics imparted by stretching exhibits increase in index of refraction in a stretched direction.

The first retardation layer 120 is optically transparent and may have a single transmittance of 90% or more, for example, 90% to 100%, at a wavelength of 550 nm.

In an embodiment, the first retardation layer 120 may include at least one resin selected from among a cellulose based resin including triacetylcellulose and the like, a polyester based resin including polyethylene terephthalate (PET), polybutylene terephthalate, polyethylene naphthalate, polybutylene naphthalate, and the like, a cyclic olefin polymer (COP) based resin, a polycarbonate based resin, a polyethersulfone based resin, a polysulfone based resin, a polyamide based resin, a polyimide based resin, a polyolefin based resin, a polyarylate based resin, a polyvinyl alcohol based resin, a polyvinyl chloride based resin, and a polyvinylidene chloride based resin. In an embodiment, the first retardation layer 120 includes a cyclic olefin polymer based film to secure short wavelength dispersion and long wavelength dispersion. In the polarizing plate according to the present invention, the cyclic olefin polymer based film can provide improvement in front reflectivity.

In an embodiment, the first retardation layer 120 may have a thickness of 20 μm to 70 μm, and, in an embodiment, 20 μm, 25 μm, 30 μm, 35 μm, 40 μm, 45 μm, 50 μm, 55 μm, 60 μm, 65 μm, or 70 μm, and, in an embodiment, 30 μm to 60 μm. Within this range, the first retardation layer 120 can be used in the polarizing plate.

The first retardation layer 120 may be formed by stretching a non-stretched film formed of an optically transparent resin and may be stacked on the polarizer 110 to fabricate the polarizing plate through a roll-to-roll process, thereby improving processability.

In an embodiment, the first retardation layer 120 is formed of an obliquely stretched film stretched in an oblique direction at an angle (e.g., a predetermined angle) with reference to the machine direction of the film in a non-stretched state and can secure the slow axis tilted with respect to the machine direction of the film. A method for obliquely stretching a film may be performed by a typical method known to those skilled in the art.

In an embodiment, an absolute value of a tilt angle ($\alpha 1$) of the slow axis of the first retardation layer with reference to the light absorption axis of the polarizer may be in a range of 10° to 30°. Within this range, an angle defined between the slow axis of the first retardation layer and the slow axis of the second retardation layer can be within a specific range, whereby the polarizing plate can reduce reflectivity at both the front side and the lateral side. In an embodiment, the absolute value of the angle $\alpha 1$ may be 10°, 11°, 12°, 13°, 14°, 15°, 16°, 17°, 18°, 19°, 20°, 21°, 22°, 23°, 24°, 25°, 26°, 27°, 28°, 29°, or 30°, and, in an embodiment, 12° to 28°, and, in an embodiment, 15° to 25°.

In an embodiment, the first retardation layer 120 may be bonded to the polarizer 110 via a first bonding layer. The first bonding layer may be formed of, for example, a water-based bonding agent and/or a photo-curable bonding agent. In an embodiment, the first bonding layer is formed of a photo-curable bonding agent, whereby bonding between the protective layer and the polarizer and bonding between the polarizer and the first retardation layer can be achieved through irradiation with light once, thereby improving processability of the polarizing plate.

In an embodiment, the second retardation layer 130 may have an in-plane retardation of 60 nm to 150 nm at a wavelength of 550 nm. Within this range, the second retardation layer 130 can assist in improvement in screen quality by reducing reflectivity at both the front side and the lateral side. In an embodiment, the second retardation layer 130 may have an in-plane retardation of 60 nm, 65 nm, 70 nm, 75 nm, 80 nm, 85 nm, 90 nm, 95 nm, 100 nm, 105 nm, 110 nm, 115 nm, 120 nm, 125 nm, 130 nm, 135 nm, 140 nm, 145 nm, or 150 nm, and, in an embodiment, 70 nm to 140 nm, or 80 nm to 135 nm, at a wavelength of 550 nm.

In an embodiment, the second retardation layer 130 exhibits positive dispersion and may have a short wavelength dispersion of 1 to 1.4 and a long wavelength dispersion of 0.90 to 1. Within this range, a difference in wavelength dispersion between the first retardation layer 120 and the second retardation layer 130 can be reduced to improve ellipticity at each wavelength, thereby improving reflectivity. In an embodiment, the second retardation layer 130 has a short wavelength dispersion of 1 to 1.2 and a long wavelength dispersion of 0.91 to 0.99.

In an embodiment, the second retardation layer 130 has an in-plane retardation of 80 nm to 160 nm, and, in an embodiment, 90 nm to 155 nm, and, in an embodiment, 95 nm to 150 nm, at a wavelength of 450 nm, and an in-plane retardation of 60 nm to 140 nm, and, in an embodiment, 65 nm to 130 nm, and, in an embodiment, 70 nm to 125 nm, at a wavelength of 650 nm. Within this range, the second retardation layer 130 can easily achieve the short wavelength dispersion and the long wavelength dispersion.

The second retardation layer 130 may have a negative (−) out-of-plane retardation at a wavelength of 550 nm, for example, an out-of-plane retardation of −210 nm to −10 nm, and, in an embodiment, −210 nm, −205 nm, −200 nm, −195 nm, −190 nm, −185 nm, −180 nm, −175 nm, −170 nm, −165 nm, −160 nm, −155 nm, −150 nm, −145 nm, −140 nm, −135 nm, −130 nm, −125 nm, −120 nm, −115 nm, −110 nm, −105 nm, −100 nm, −95 nm, −90 nm, −85 nm, −80 nm, −75 nm, −70 nm, −65 nm, −60 nm, −55 nm, −50 nm, −45 nm, −40 nm, −35 nm, −30 nm, −25 nm, −20 nm, −15 nm, or −10 nm, and, in an embodiment, −180 nm to −40 nm, at a wavelength of 550 nm. Within this range, the polarizing plate can reduce lateral reflectivity through improvement in degree of circular polarization with respect to the lateral side.

The second retardation layer 130 may have a negative degree of biaxiality at a wavelength of 550 nm, for example, a degree of biaxiality of −1 to −0.01, and, in an embodiment, −1, −0.95, −0.9, −0.85, −0.8, −0.75, −0.7, −0.65, −0.6, −0.55, −0.5, −0.45, −0.4, −0.35, −0.3, −0.25, −0.2, −0.15, −0.1, −0.05, or −0.01, and, in an embodiment, −0.7 to −0.01, at a wavelength of 550 nm. Within this range, the polarizing plate can reduce lateral reflectivity through improvement in degree of circular polarization with respect to the lateral side.

In an embodiment, an absolute value of a tilt angle α2 of the slow axis of the second retardation layer 130 with reference to the light absorption axis of the polarizer is in a range of 79° to 89°. Within this range, an angle defined between the slow axis of the first retardation layer 120 and the slow axis of the second retardation layer 130 can be within a specific range, whereby the polarizing plate can reduce front and lateral reflectivity. In an embodiment, the absolute value of the angle α2 may be 79°, 80°, 81°, 82°, 83°, 84°, 85°, 86°, 87°, 88°, or 89°, and, in an embodiment, 81° to 87°.

In an embodiment, the angle α1 may be in a range of 10° to 30°, and the angle α2 may be in a range of 79° to 89°. In another embodiment, the angle α1 may be in a range of 12° to 28°, and the angle α2 may be in a range of 81° to 87°.

In an embodiment, the angle defined between the slow axis of the first retardation layer 120 and the slow axis of the second retardation layer 130 may be in a range of 49° to 79°, and, in an embodiment, 49°, 50°, 51°, 52°, 53°, 54°, 55°, 56°, 57°, 58°, 59°, 60°, 61°, 62°, 63°, 64°, 65°, 66°, 67°, 68°, 69°, 70°, 71°, 72°, 73°, 74°, 75°, 76°, 77° 78°, or 79°, and, in an embodiment, 54° to 74°, and, in an embodiment, 57° to 71°. Within this range, the polarizing plate can have a high degree of circular polarization at the front side.

The second retardation layer 130 may have a smaller thickness than the first retardation layer 120, for example, a thickness of about 1 μm to about 15 μm, and, in an embodiment, 1 μm, 2 μm, 3 μm, 4 μm, 5 μm, 6 μm, 7 μm, 8 μm, 9 μm, 10 μm, 11 μm, 12 μm, 13 μm, 14 μm, or 15 μm, and, in an embodiment, 3 μm to 12 μm. Within this range, the second retardation layer 130 can efficiently exhibit good out-of-plane retardation (Rth) over the entire width thereof and enables reduction in thickness of the polarizing plate.

In an embodiment, the second retardation layer 130 may have an index of refraction of 1.4 to 1.6, and, in an embodiment, 1.45 to 1.6. Within this range, the second retardation layer 130 can have improved transparency through control of the index of refraction, as compared to the first retardation layer 120.

The second retardation layer 130 is formed of a composition for the second retardation layer described below. Here, the second retardation layer 130 may be formed to have the slow axis tilted at an angle within a certain range (e.g., a predetermined range) with respect to the transmission axis of the polarizer 110 by controlling a coating direction and/or a coating method, whereby the polarizing plate can reduce front and lateral reflectivity while improving ellipticity at the lateral side and black visibility at the front side.

To secure the above in-plane retardation at a wavelength of 550 nm, the second retardation layer 130 may include a coating layer formed of a composition for the second retardation layer 130 described below, as a non-liquid crystal layer. In an embodiment, the second retardation layer 130 may be directly formed on the first retardation layer 120.

The second retardation layer 130 may include a resin having negative (−) birefringence. Here, "negative (−) birefringence" means that a transparent film having birefringence characteristics imparted by stretching exhibits increase in index of refraction in a direction perpendicular to the stretched direction.

Herein, the composition for the second retardation layer 130 will be described.

The second retardation layer 130 may be a non-liquid crystal layer. For the second retardation layer 130 including liquid crystals, an alignment film for alignment of the liquid crystals at a certain angle is provided to the polarizing plate, thereby causing generation of foreign matter.

In an embodiment, the composition for the second retardation layer 130 is a non-liquid crystal composition and includes a cellulose based polymer including a cellulose ester or cellulose ether based polymer and/or a polystyrene based polymer.

Next, the cellulose ester polymer will be described.

Herein, "polymer" means an oligomer, a polymer, or a resin.

The cellulose ester polymer may include an ester polymer having an acyl unit, in which at least some hydroxyl groups [a $C_2$ hydroxyl group, a $C_3$ hydroxyl group or a $C_6$ hydroxyl group] of a sugar monomer constituting cellulose are unsubstituted or substituted, as represented by the following Formula 1:

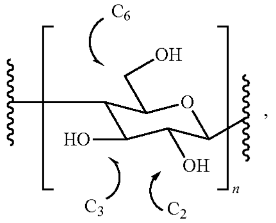

where n is an integer of 1 or more.

A substituent group for the cellulose ester polymer may include at least one selected from among a halogen atom, a nitro group, an alkyl group (for example, a $C_1$ to $C_{20}$ alkyl group), an alkenyl group (for example, a $C_2$ to $C_{20}$ alkenyl group), a cycloalkyl group (for example, a $C_3$ to $C_{10}$ cycloalkyl group), an aryl group (for example, a $C_6$ to $C_{20}$ aryl group), a hetero-aryl group (for example, a $C_3$ to $C_{10}$ hetero-aryl group), an alkoxy group (for example, a $C_1$ to $C_{20}$ alkoxy group), an acyl group, and a halogen-containing functional group. The substituent groups may be the same as or different from each other.

Herein, "acyl" may mean R—C(═O)—* (* being a linking site, R being a $C_1$ to $C_{20}$ alkyl group, a $C_3$ to $C_{20}$ cycloalkyl group, a $C_6$ to $C_{20}$ aryl group, or a $C_7$ to $C_{20}$ arylalkyl group), as well-known in the art. The "acyl" is coupled to a ring of the cellulose through ester bonding (through an oxygen atom) in the cellulose.

Here, "alkyl," "alkenyl," "cycloalkyl," "aryl," "hetero-aryl," "alkoxy," and "acyl" refer to non-halogen compounds for convenience. The composition for the second retardation layer may include the cellulose ester polymer alone or a mixture including the cellulose ester polymer.

Here, "halogen" means fluorine (F), Cl, Br, or I, and, in an embodiment, F.

The "halogen-containing functional group" is an organic functional group containing at least one halogen atom and may include an aromatic, aliphatic, or alicyclic functional group. For example, the halogen-containing functional group may mean a halogen-substituted $C_1$ to $C_{20}$ alkyl group, a halogen-substituted $C_2$ to $C_{20}$ alkenyl group, a halogen-substituted $C_2$ to $C_{20}$ alkynyl group, a halogen-substituted $C_3$ to $C_{10}$ cycloalkyl group, a halogen-substituted $C_1$ to $C_{20}$ alkoxy group, a halogen-substituted acyl group, a halogen-substituted $C_6$ to $C_{20}$ aryl group, or a halogen-substituted $C_7$ to $C_{20}$ arylalkyl group, without being limited thereto.

The "halogen-substituted acyl group" may be R'—C(═O)—* (* being a linking site, R' being a halogen-substituted $C_1$ to $C_{20}$ alkyl group, a halogen-substituted $C_3$ to $C_{20}$ cycloalkyl group, a halogen-substituted $C_6$ to $C_{20}$ aryl group, or a halogen-substituted $C_7$ to $C_{20}$ arylalkyl group). The "halogen-substituted acyl group" may be coupled to a ring of the cellulose through ester bonding (through an oxygen atom) in the cellulose.

In an embodiment, the composition for the second retardation layer 130 includes a cellulose ester polymer substituted with an acyl group, a halogen, or a halogen-containing functional group. In an embodiment, the halogen is fluorine. In an embodiment, the halogen may be present in an amount of 1 wt % to 10 wt % in the cellulose ester polymer. Within this range, the composition allows easy formation of the second retardation layer 130 having properties of the present invention and can improve the degree of circular polarization (ellipticity).

For formation of the second retardation layer 130, the cellulose ester polymer may be prepared by a typical method known to those skilled in the art or may be obtained from commercially available products. For example, the cellulose ester polymer having an acyl group as a substituent group may be prepared by reacting trifluoroacetic acid or trifluoroacetic anhydride with the sugar monomer constituting the cellulose represented by Formula 1 or a polymer of the sugar monomer, by reacting trifluoroacetic acid or trifluoroacetic anhydride therewith, followed by additionally reacting an acylation agent (for example, carboxylic anhydride or carboxylic acid) therewith, or by reacting both trifluoroacetic acid or trifluoroacetic anhydride and the acylation agent therewith.

The polystyrene based polymer may include a moiety represented by the following Formula 2:

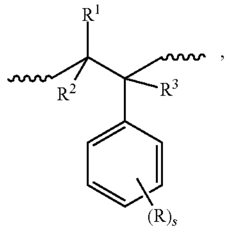

where $R^1$, $R^2$, and $R^3$ are each independently a hydrogen atom, an alkyl group, a substituted alkyl group, or a halogen; Rs are each independently a substituent group on a styrene ring; and n is an integer of 0 to 5 indicating the number of substituent groups on the styrene ring.

Examples of the substituent group R and the "substituted alkyl group" on the styrene ring may include an alkyl group, a substituted alkyl group, a halogen atom, a hydroxyl group, a carboxyl group, a nitro group, an alkoxy group, an amino group, a sulfonate group, a phosphate group, an acyl group, an acyloxy group, a phenyl group, an alkoxycarbonyl group, and a cyano group.

In an embodiment, at least one of $R^1$, $R^2$, and $R^3$ may be a halogen, and, in an embodiment, fluorine.

The composition for the second retardation layer 130 may further include an aromatic fusion ring-containing additive. The aromatic fusion ring-containing additive serves to adjust wavelength dispersion. Examples of the aromatic fusion ring-containing additive may include 2-naphthylbenzoate, anthracene, phenanthrene, 2,6-naphthalene dicarboxylic diester, and the like. In an embodiment, the aromatic fusion ring-containing additive may be present in an amount of 0.1 wt % to 30 wt %, and, in an embodiment, 1 wt % to 10 wt %, in the composition for the second retardation layer 130. Within this range, the aromatic fusion ring-containing additive can adjust retardation and wavelength dispersion.

The composition for the second retardation layer 130 may further include typical additives known to those skilled in the art. The additives may include pigments and antioxidants, without being limited thereto.

Although not shown in FIG. 1, in an embodiment, an adhesive layer or a bonding layer is formed on a lower surface of the second retardation layer 130 to allow the polarizing plate to be stacked on a device of an optical display apparatus, for example, a light emitting diode panel.

Laminate of First Retardation Layer and Second Retardation Layer

In an embodiment, a laminate of the first retardation layer 120 and the second retardation layer 130 may have an in-plane retardation of 120 nm to 210 nm, and, in an embodiment, 120 nm, 125 nm, 130 nm, 135 nm, 140 nm, 145 nm, 150 nm, 155 nm, 160 nm, 165 nm, 170 nm, 175 nm, 180 nm, 185 nm, 190 nm, 200 nm, 205 nm, or 210 nm, and, in an embodiment, 130 nm to 200 nm, at a wavelength of 550 nm. Within this range, the polarizing plate can reduce reflectivity while improving the degree of circular polarization.

The laminate of the first retardation layer 120 and the second retardation layer 130 may be formed by coating the composition for the second retardation layer 130 on the first retardation layer 120, followed by oblique stretching with reference to the MD of the first retardation layer 120. In an embodiment, the laminate of the first retardation layer 120 and the second retardation layer 130 may be formed by coating the composition for the second retardation layer 130 on the first retardation layer 120 in a non-stretched or obliquely stretched state or on a non-stretched or obliquely stretched film for the first retardation layer 120 to form a coating for the second retardation layer 130, followed by oblique stretching in the MD or in an oblique direction with reference to the MD of the first retardation layer 120 or the film for the first retardation layer 120. In an embodiment, the first retardation layer 120 and the second retardation layer 130 realize a difference in retardation between the first retardation layer 120 and the second retardation layer 130 in the polarizing plate according to the present invention through oblique stretching in the oblique direction with reference to the MD of the first retardation layer 120 or the film for the first retardation layer 120.

In an embodiment, the polarizing plate may further include a third retardation layer (not shown) on a lower surface of the polarizer 110.

With the third retardation layer formed between the polarizer 110 and the first retardation layer 120, the polarizing plate can achieve additional improvement in lateral reflectivity.

The third retardation layer may include a positive C retardation layer, which satisfies Relation: nz>nx≈ny (nx, ny, and nz being indices of refraction of the third retardation layer at a wavelength of 550 nm in the slow direction, the fast direction, and the thickness direction thereof, respectively).

In an embodiment, the third retardation layer may have an out-of-plane retardation of −300 nm to 0 nm, for example, −200 nm to −30 nm, at a wavelength of 550 nm. The third retardation layer may have an in-plane retardation of 0 nm to 10 nm, for example, 0 nm to 5 nm, at a wavelength of 550 nm. Within this range, the polarizing plate can achieve reduction in front reflectivity.

In an embodiment, the third retardation layer may be a liquid crystal layer. The liquid crystal layer may be formed of a typical material to realize the above out-of-plane retardation.

In another embodiment, the third retardation layer may be formed of the composition for the second retardation layer described above.

An optical display apparatus according to the present invention may include the polarizing plate according to an embodiment of the present invention. In one or more embodiments, the optical display apparatus may include any of an organic light emitting diode (OLED) display and a liquid crystal display.

In an embodiment, the OLED display may include: an OLED panel including a flexible substrate; and the polarizing plate according to an embodiment of the present invention stacked on the OLED panel.

In another embodiment, the OLED display may include: an OLED panel including a non-flexible substrate; and the polarizing plate according to an embodiment of the present invention stacked on the OLED panel.

Next, the present invention will be described in further detail with reference to some examples. However, these examples are provided for illustration and should not be construed in any way as limiting the present invention.

Example 1

Fabrication of Retardation Layer

A coating for a second retardation layer was formed by depositing a composition [non-liquid crystal composition containing a cellulose ester polymer (containing trifluoroacetylcellulose)] for the second retardation layer on a lower surface of a cyclic olefin polymer (COP) film stretched in an oblique direction with respect to the MD. A laminate of a first retardation layer and a second retardation layer having specifications listed in Table 1 was prepared by stretching a laminate of the coating and the COP film in the MD of the COP film after drying the coating.

Optical characteristics of the first and second retardation layers are shown in Table 1. Re, Rth, and NZ of each of the first retardation layer and the second retardation layer were measured using an AxoScan (Axometry) at a wavelength of 550 nm.

TABLE 1

| | Wavelength dispersion | Short wavelength dispersion | Long wavelength dispersion | Re | Rth | NZ |
|---|---|---|---|---|---|---|
| First retardation layer | Positive dispersion | 1.02 | 0.99 | 250 | 160 | 1.15 |
| Second retardation layer | Positive dispersion | 1.10 | 0.95 | 115 | −73 | −0.09 |

Fabrication of Polarizer

A polyvinyl alcohol based film (VF-TS #4500, pre-stretching thickness: 45 μm, hydrophobic functional group-containing main chain, Kuraray Co., Ltd., Japan) washed with water was subjected to swelling with water at 30° C. in a swelling bath.

Next, the polyvinyl alcohol based film was left in a dyeing bath filled with an aqueous solution containing 3 wt % of potassium iodide at 30° C. for 200 seconds. Then, the polyvinyl alcohol based film was passed through a wet crosslinking bath filled with an aqueous solution containing 2.5 wt % of boric acid at 30° C. Next, the polyvinyl alcohol based film was stretched to a total elongation of 6 times an initial length thereof in a wet stretching bath filled with an aqueous solution containing 2.5 wt % of boric acid and 3 wt % of potassium iodide at 50° C.

Next, the polyvinyl alcohol based film was dipped in a color correction bath containing 1 wt % of boric acid and 5 wt % of potassium iodide at 25° C. for 100 seconds, followed by washing and drying, thereby preparing a polarizer (thickness: 12 μm). The polarizer had a single transmittance of 44.0% and a minimum crossed transmittance of 0.0057% at a wavelength of 400 nm to 700 nm.

Fabrication of Polarizing Plate

A protective film (polyethylene terephthalate film having an antireflection layer on an upper surface thereof, reflectivity: 0.5%, in-plane retardation at 550 nm: 6,000 nm, out-of-plane retardation at 550 nm: 8,000 nm, water vapor transmission rate: 15 g/m$^2$·day, DSG23-PET, DNP) was prepared.

A polarizing plate in which the protective film, the polarizer, the first retardation layer, and the second retardation layer are sequentially stacked in the stated order was fabricated by attaching the protective film to an upper surface of the polarizer and attaching the retardation layer to a lower surface of the polarizer.

In the polarizing plate, the slow axis of the protective film was tilted at an angle of +2° with respect to the light absorption axis of the polarizer. The slow axis of the first retardation layer was tilted at an angle of 21° with respect to the light absorption axis of the polarizer, and the slow axis of the second retardation layer was tilted at an angle of 84° with respect to the light absorption axis of the polarizer.

Examples 2 to 4

Polarizing plates were fabricated in the same manner as in Example 1 except that the single transmittance and the crossed transmittance of the polarizer were changed by changing a stretching ratio in fabrication of the polarizer, and the tilted angle of the slow axis of the protective film with respect to the light absorption axis of the polarizer was changed as listed in Table 2.

Comparative Examples 1 to 3, 7, 9, and 11

Polarizing plates were fabricated in the same manner as in Example 1 except that the single transmittance and the crossed transmittance of the polarizer were changed by changing a stretching ratio in fabrication of the polarizer, and the tilted angle of the slow axis of the protective film with respect to the light absorption axis of the polarizer was changed as listed in Table 2.

Comparative Examples 4 to 6, 8, 10, and 12

For each of polarizing plates, the single transmittance and the crossed transmittance of the polarizer were changed by changing the elongation in fabrication of the polarizer in Example 1.

A protective film (polyethylene terephthalate film having an antireflection layer on an upper surface thereof, reflectivity: 0.5%, in-plane retardation at 550 nm: 5 nm, no optical axis in in-plane direction, water vapor transmission rate: 600 $g/m^2$·day, DSG23-TAC, DNP) was prepared.

A polarizing plate in which the protective film, the polarizer, the first retardation layer, and the second retardation layer are sequentially stacked in the stated order was fabricated by attaching the protective film to an upper surface of the polarizer and attaching the retardation layer to a lower surface of the polarizer.

The polarizing plates of the Examples and Comparative Examples were evaluated as to the following properties and results are shown in Tables 2 and 3.

(1) Deviation of crossed optical characteristics: As crossed optical characteristics, crossed transmittance Tc, luminance Lc, color value ac, and color value bc were measured on each of the polarizing plates fabricated in the Examples and Comparative Examples.

The crossed transmittance Tc, the luminance Lc, the color value ac, and the color value bc were measured using a UV-VIS spectrophotometer (V-7100, JASCO). Here, in the UV-VIS spectrophotometer (V-7100, JASCO), the optical characteristics were measured by emitting light from a protective film side toward the polarizer.

A deviation of the crossed optical characteristics was calculated using a reference polarizing plate of Table 2 according to the following Equation 3:

$$\text{Deviation of crossed optical characteristics}=|(A-B)/B|\times 100, \quad \text{Equation 3}$$

where A is a value of the crossed optical characteristics, as measured on the polarizing plate including the protective film stacked on the upper surface of the polarizer and having an optical axis; and B is a value of the crossed optical characteristics, as measured on a polarizing plate (reference polarizing plate) including a protective layer stacked on the upper surface of the polarizer and having no optical axis.

(2) Improvement in accuracy of measurement of crossed optical characteristics: A deviation of crossed optical characteristic of 10% or less indicates improvement in accuracy of measurement of the polarizing plate due to a low error from a true value of the crossed optical characteristics.

(3) Durability under high temperature/humidity conditions: Single transmittance (Ts) and polarization degree (PE) were measured on a polarizing plate specimen using a UV-VIS spectrophotometer (V-7100, JASCO). Next, the specimen was left at 60° C. and 95% RH for 1,000 hours, followed by measurement of the single transmittance (Ts) and the polarization degree (PE) of the specimen in the same manner. The polarizing plate specimen was prepared by cutting the polarizing plate such that the polarizer had a size of 5 cm×5 cm in MD×TD. Single transmittance variation rate and polarization variation rate were calculated according to Equations 1 and 2.

TABLE 2

| | Polarizer | | | Tc | | |
|---|---|---|---|---|---|---|
| | Single transmittance | Minimum crossed transmittance | Angle | Measurement | Eq. 3 (%) | Lc Measurement |
| Example 1 | 44 | 0.0057 | +2 | 0.022 | 4.76 | 1.53 |
| Example 2 | 44 | 0.0057 | −2 | 0.022 | 4.76 | 1.48 |
| Comparative Example 1 | 44 | 0.0057 | +3 | 1.12 | 5233.33 | 10.54 |
| Comparative Example 2 | 44 | 0.0057 | +5 | 1.17 | 5471.43 | 10.77 |
| Comparative Example 3 | 44 | 0.0057 | +10 | 3.17 | 14995.24 | 17.74 |
| Comparative Example 4 | 44 | 0.0057 | — | 0.021 | 0.00 | 1.44 |
| Example 3 | 45 | 0.176 | +2 | 0.384 | 2.95 | 0.62 |
| Comparative Example 5 | 45 | 0.176 | — | 0.373 | 0.00 | 6.11 |
| Example 4 | 44.5 | 0.0208 | −2 | 0.072 | 4.00 | 2.68 |
| Comparative Example 6 | 44.5 | 0.0208 | — | 0.075 | 0.00 | 2.75 |
| Comparative Example 7 | 43.5 | 0.0005 | +2 | 0.02 | 1150.00 | 1.41 |
| Comparative Example 8 | 43.5 | 0.0005 | — | 0.002 | 0.00 | 0.41 |
| Comparative Example 9 | 43.8 | 0.0055 | +2 | 0.023 | 12.20 | 1.63 |
| Comparative Example 10 | 43.8 | 0.0055 | — | 0.021 | 0.00 | 1.43 |
| Comparative Example 11 | 44 | 0.0031 | +2 | 0.12 | 700.00 | 1.09 |
| Comparative Example 12 | 44 | 0.0031 | — | 0.015 | 0.00 | 0.38 |

TABLE 2-continued

| | Lc | ac | | be | | |
|---|---|---|---|---|---|---|
| | Eq. 3 (%) | Measurement | Eq. 3 (%) | Measurement | Eq. 3 (%) | Remark |
| Example 1 | 6.25 | 0.14 | 6.67 | −1.56 | 0.00 | — |
| Example 2 | 2.78 | 0.14 | 6.67 | −1.53 | 1.92 | — |
| Comparative Example 1 | 631.94 | −0.36 | 340.00 | 0.82 | 152.56 | — |
| Comparative Example 2 | 647.92 | −0.35 | 333.33 | 0.77 | 149.36 | — |
| Comparative Example 3 | 1131.94 | −0.61 | 506.67 | 1.53 | 198.08 | — |
| Comparative Example 4 | 0.00 | 0.15 | 0.00 | −1.56 | 0.00 | Reference polarizing plate |
| Example 3 | 1.47 | −0.23 | 0.00 | −1.04 | 0.00 | — |
| Comparative Example 5 | 0.00 | −0.23 | 0.00 | −1.04 | 0.00 | Reference polarizing plate |
| Example 4 | 2.55 | −0.04 | 0.00 | −1.58 | 5.39 | — |
| Comparative Example 6 | 0.00 | −0.04 | 0.00 | −1.67 | 0.00 | Reference polarizing plate |
| Comparative Example 7 | 244.83 | 0.05 | 87.10 | −0.08 | 82.70 | — |
| Comparative Example 8 | 0.00 | 0.39 | 0.00 | −0.46 | 0.00 | Reference polarizing plate |
| Comparative Example 9 | 13.99 | 0.13 | 13.33 | −1.45 | 7.64 | — |
| Comparative Example 10 | 0.00 | 0.15 | 0.00 | −1.57 | 0.00 | Reference polarizing plate |
| Comparative Example 11 | 186.84 | 0.09 | 75.00 | −0.3 | 53.13 | — |
| Comparative Example 12 | 0.00 | 0.36 | 0.00 | −0.64 | 0.00 | Reference polarizing plate |

*Angle: Angle of the slow axis of the protective film with respect to light absorption axis of the polarizer

TABLE 3

| | Item | 0 hr | 250 hr | 500 hr | 750 hr | 1,000 hr | Variation |
|---|---|---|---|---|---|---|---|
| Example 1 | Ts | 45.1 | 44.9 | 44.9 | 44.9 | 45.0 | −0.1 |
| | PE | 99.94 | 99.97 | 99.97 | 99.97 | 99.97 | 0.03 |
| Comparative Example 4 | Ts | 45.1 | 44.8 | 45.0 | 45.3 | 45.8 | 0.7 |
| | PE | 99.95 | 99.95 | 99.85 | 99.37 | 98.22 | −1.73 |

As shown in Table 3, the polarizing plates according to the present invention had very low variation rates of the single transmittance and the polarization degree after being left under high temperature/humidity conditions for a long period of time, thereby securing good durability under high temperature/humidity conditions. By contrast, the polarizing plate of Comparative Example 4 exhibited much lower durability under high temperature/humidity conditions than the polarizing plate of Example 1.

As shown in Table 2, upon measurement of the crossed optical characteristics by emitting light from a protective film side toward the polarizer, all of the crossed optical characteristics of the polarizing plates according to the present invention had a deviation of 10% or less, thereby securing improvement in measurement accuracy. By contrast, the polarizing plates of the Comparative Examples, failing to satisfy the features of the present invention, had higher measurement accuracy than the polarizing plates of the Examples.

Although some embodiments have been described herein, it is to be understood that various modifications, changes, alterations, and equivalent embodiments can be made by those skilled in the art without departing from the spirit and scope of the present invention.

What is claimed is:

1. A polarizing plate comprising: a polarizer; a protective layer stacked on a surface of the polarizer; and a retardation layer stacked on another surface of the polarizer, wherein:

the polarizer comprises a polyvinyl alcohol based film dyed in a dyeing solution containing 1 wt % to 5 wt % of at least one of iodine or a dichroic dye;

the protective layer comprises at least one selected from among a polyester based resin, a cyclic olefin polymer based resin, and a (meth)acrylic based resin;

the protective layer has an in-plane retardation of 3,000 nm or more at a wavelength of 550 nm;

an optical axis of the protective layer is tilted at an angle of −2° to +2° with respect to a light absorption axis of the polarizer;

the polarizer has a single transmittance of 44.0% or more; and the polarizer has a minimum crossed transmittance of 0.005% to 5% at a wavelength of 400 nm to 700 nm.

2. The polarizing plate according to claim 1, wherein the protective layer has a water vapor transmission rate of 30 $g/m^2\cdot day$ or less.

3. The polarizing plate according to claim 1, wherein the optical axis is a slow axis or a fast axis of the protective layer.

4. The polarizing plate according to claim 1, wherein the protective layer further comprises an antireflection layer, a low reflectivity layer, an antiglare layer, a hard coating layer, a fingerprint resistant layer, or a primer layer on a surface thereof or on another surface thereof.

5. The polarizing plate according to claim 1, wherein the protective layer has a reflectivity of 1% or less.

6. The polarizing plate according to claim 1, wherein the polarizer has a maximum crossed transmittance at a wavelength of 480 nm to 550 nm in a wavelength range of 450 nm to 580 nm.

7. The polarizing plate according to claim 1, wherein the retardation layer comprises a first retardation layer and a second retardation layer.

8. The polarizing plate according to claim 7, wherein an absolute value of a tilted angle of a slow axis of the first retardation layer with reference to the light absorption axis of the polarizer is in a range of 10° to 30°.

9. The polarizing plate according to claim 7, wherein an absolute value of a tilted angle of a slow axis of the second retardation layer with reference to the light absorption axis of the polarizer is in a range of 79° to 89°.

10. The polarizing plate according to claim 7, wherein an angle defined between a slow axis of the first retardation layer and a slow axis of the second retardation layer is in a range of 49° to 79°.

11. The polarizing plate according to claim 7, wherein the first retardation layer has an in-plane retardation of 210 nm to 270 nm at a wavelength of 550 nm, and the second retardation layer has an in-plane retardation of 60 nm to 150 nm at a wavelength of 550 nm.

12. The polarizing plate according to claim 1, wherein the polarizing plate has a deviation of crossed optical characteristics of 10% or less, as calculated by the following Equation 3:

$$\text{Deviation of crossed optical characteristics}=|(A-B)/B|\times 100,$$

where A is a value of the crossed optical characteristics, as measured on the polarizing plate including the protective layer stacked on an upper surface of the polarizer and having the optical axis, and B is a value of the crossed optical characteristics, as measured on a reference polarizing plate including a protective layer stacked on the upper surface of the polarizer and having no optical axis.

13. An optical display apparatus comprising the polarizing plate according to claim 1.

* * * * *